(12) United States Patent
Monden et al.

(10) Patent No.: US 7,070,631 B2
(45) Date of Patent: Jul. 4, 2006

(54) METHOD FOR PRODUCING ALUMINUM FOIL FOR CAPACITOR AND SOLID ELECTROLYTIC CAPACITOR

(75) Inventors: Ryuji Monden, Chiba (JP); Atsushi Sakai, Tokyo (JP); Teruto Ohta, Chiba (JP)

(73) Assignee: Showa Denko K.K., Tokyo (JP)

( * ) Notice: Subject to any disclaimer, the term of this patent is extended or adjusted under 35 U.S.C. 154(b) by 170 days.

(21) Appl. No.: 10/466,517

(22) PCT Filed: Feb. 7, 2002

(86) PCT No.: PCT/JP02/01024

§ 371 (c)(1),
(2), (4) Date: Jul. 17, 2003

(87) PCT Pub. No.: WO02/063645

PCT Pub. Date: Aug. 15, 2002

(65) Prior Publication Data

US 2004/0052032 A1    Mar. 18, 2004

Related U.S. Application Data

(60) Provisional application No. 60/270,140, filed on Feb. 22, 2001, provisional application No. 60/307,390, filed on Jul. 25, 2001.

(30) Foreign Application Priority Data

Feb. 8, 2001  (JP) ............................. 2001-032796
Jul. 19, 2001  (JP) ............................. 2001-219921

(51) Int. Cl.
*H01G 9/00*    (2006.01)

(52) U.S. Cl. ................... 29/25.03; 361/523; 361/525; 361/528; 361/529; 361/530

(58) Field of Classification Search ........ 361/523–525, 361/528–532, 508–512, 502–504; 29/25.03
See application file for complete search history.

(56) References Cited

U.S. PATENT DOCUMENTS 4,510,207 A * 4/1985 Mehada et al. ............. 428/607

(Continued)

FOREIGN PATENT DOCUMENTS

| JP | 57-180115 | 11/1982 |
| JP | 2-178911 A | 7/1990 |

(Continued)

OTHER PUBLICATIONS

International Search Report for PCT/JP02/01024 dated May 21, 2002.

*Primary Examiner*—Nguyen T. Ha
(74) *Attorney, Agent, or Firm*—Sughrue Mion, PLLC

(57) ABSTRACT

A method for producing an aluminum foil for solid electrolytic capacitors, comprising the steps of cutting an aluminum foil into a shape of a capacitor element, etching a cut end part formed by said cutting, and then electrochemically forming the etched aluminum foil, aluminum foil for solid electrolytic capacitors obtained by the method, solid electrolytic capacitor using the aluminum foil, and method for producing such a solid electrolytic capacitor are disclosed. By use of the aluminum foil for solid electrolytic capacitors according to the present invention, capacitor characteristics such as an increase in the capacitor capacitance and a decrease in the leakage current from the cut end part of a stacked type aluminum solid electrolytic capacitor can be efficiently improved, the anode moieties can be efficiently connected without fail on stacking elements and the productivity of stacked type aluminum solid electrolytic capacitor can be elevated.

27 Claims, 2 Drawing Sheets

U.S. PATENT DOCUMENTS

| | | |
|---|---|---|
| 5,500,101 A | 3/1996 | Yoneyama |
| 5,922,215 A * | 7/1999 | Pless et al. ............... 216/6 |
| 6,243,256 B1 * | 6/2001 | Furuta et al. ............ 361/528 |
| 6,660,188 B1 * | 12/2003 | Ohata et al. ............. 252/500 |
| 6,890,363 B1 * | 5/2005 | Sakai et al. ............ 29/25.03 |

FOREIGN PATENT DOCUMENTS

| | | |
|---|---|---|
| JP | 07-169657 A | 7/1995 |
| JP | 11-307400 A | 11/1999 |
| JP | 2000-195758 | 7/2000 |
| JP | 2000-297142 | 10/2000 |

* cited by examiner

METHOD FOR PRODUCING ALUMINUM FOIL FOR CAPACITOR AND SOLID ELECTROLYTIC CAPACITOR

CROSS-REFERENCE TO RELATED APPLICATIONS

This is an application filed pursuant to Section 111 (a) with a claim to priority to Provisional Application Ser. Nos. 60/270,140 filed Feb. 22, 2001 and 60/307,390 filed Jul. 25, 2001 pursuant to 35 U.S.C. Section 119(e) (1) in accordance with 35 U.S.C. 111(b).

TECHNICAL FIELD

The present invention relates to a method for producing an aluminum foil for solid electrolytic capacitors used in various electronic instruments and also relates to a capacitor using the aluminum foil. More specifically, the present invention relates to a method for etching and electrochemically forming an aluminum foil for multilayer-type aluminum solid electrolytic capacitors, and a solid electrolytic capacitor using an aluminum foil obtained by the method.

BACKGROUND ART

To meet requirements for compact electronic instruments, high density mounting on a printed board, efficient mounting and the like, manufacture of electronic parts in a chip form and in a small size is drastically proceeding and accompanying this, demands for manufacture of electrolytic capacitors used as the parts in a chip form and in a reduced size are increasing. For this purpose and also in view of easy handleability, solid electrolytic capacitors not using an electrolytic solution are abruptly growing in recent years.

In the fabrication of a solid electrolytic capacitor in general, the surface of anode material comprising a valve-acting metal such as aluminum, tantalum, niobium or titanium is etched to roughen the surface, thereby forming pits in the micron order and enlarging the surface area, an oxide dielectric film is formed thereon by an electrochemical forming, a solid electrolytic solution working out to a cathode material is impregnated between the oxide dielectric film and the anode moiety through a separator (masking), the obtained capacitor element is coiled or stacked and then housed in a cylindrical metal case, and the opening of the metal case is sealed with a sealing member. In the case of a chip-type solid electrolytic capacitor, a solid electrolyte is impregnated into an electrolytic foil having formed thereon an oxide dielectric film, a cathode electrically conducting layer comprising a carbon paste layer and silver paste is formed thereon, and then the outer jacket is formed.

Among the above-described valve-acting metals, aluminum has the advantages that the surface area can be easily enlarged by etching, the oxide film formed on the surface by anodization (electrochemical forming) using the aluminum as anode can be utilized as a dielectric material and therefore, a small-size and large-capacitance solid electrolytic capacitor can be inexpensively produced as compared with other capacitors. From these reasons, aluminum solid electrolytic capacitors for low voltage are being widely used.

The electrode foil used in the aluminum solid electrolytic capacitor is obtained by electrochemically or chemically etching an aluminum foil to enlarge the surface area, stamping it out into a product pattern shape and electrochemically forming the cut end portion of the foil.

The method for etching the aluminum foil includes a D.C. (direct current) electrolytic etching method of performing the etching by passing a direct current through an electrolytic solution comprising a chloride ion-containing aqueous solution having added thereto phosphorus acid, sulfuric acid, nitric acid or the like, using the aluminum foil as a positive electrode and an electrode disposed adjacent to the aluminum foil as a negative electrode; and an A.C. (alternating current) electrolytic etching method of performing the etching by applying an A.C. voltage between electrodes disposed at both ends of the aluminum foil in an electrolytic solution comprising a chloride ion-containing aqueous solution having added thereto phosphorus acid, sulfuric acid, nitric acid or the like.

In the D.C. electrolytic etching, corrosion proceeds like a tunnel in the direction perpendicular to the aluminum surface. On other hand, in the A.C. electrolytic etching, corrosion proceeds like a rosary running in the random direction and this is advantageous for the enlargement of the surface area (surface enlargement). Therefore, A.C. electrolytic etching on aluminum foil is predominating. However, a method of combining these two methods and a method of gradually elevating the A.C. voltage are also proposed (see, JP-A-11-307400 (the term "JP-A" as used herein means an "unexamined published Japanese patent application")). In addition, a method of enhancing the effective surface enlargement by designing the waveform, amplitude and the like of the alternating current (see, JP-A-7-235456 (U.S. Pat. No. 5,500,101)) and a method of using aluminum containing a specific metal serving as a starting point of corrosion are proposed (see, JP-A-7-169657).

The present inventors have previously proposed a production method of a solid electrolytic capacitor element, where one side of each metal foil (aluminum foil) cut into a predetermined rectangular shape are fixed to a metal-made linear support (metal-made guide) to lay the metal foils in a row, the metal foil in the region where a solid electrolyte is formed is entirely subjected to an electrochemical forming, a masking treatment is applied to the boundary between the electrochemically formed region where a solid electrolyte is formed and the region which works out to an anode terminal, and then a solid electrolyte is formed. According to this method, the electrochemical forming even in the cut end portion generated by the cutting can be completely attained and therefore, a leakage current due to invasion of solid electrolyte or electrically conducting paste into the cut end portion can be prevented.

In the manufacture of a solid electrolytic capacitor by the above-described method, a plurality of elements with the cut end portion being electrochemically formed are generally stacked for obtaining a capacitor having a predetermined capacitance, an anode leading wire is connected to the anode terminal, a cathode leading wire is connected to the electrically conducting layer containing an electrically conducting polymer, and the device as a whole is molded with an insulating resin such as epoxy resin to manufacture a solid electrolytic capacitor.

In this solid electrolytic capacitor, the cut end portion in the non-etched state is electrochemically formed, so that unless the polymerization conditions are precisely controlled during the bonding process of an electrically conducting polymer in the cathode moiety, the electrically conducting polymer is not uniformly formed or is liable to extend over the masking and adhere to the anode moiety and this gives rise to problems such as decrease in the capacitance and increase in the equivalent series resistance (ESR) and in the leakage current. Furthermore, the sagging of cut end part at the cutting incurs worsening of the above-described capacitor characteristics.

In the case where the anode moiety of a solid electrolytic capacitor element is etched and electrochemically formed to form a dielectric layer, a connection failure may arise in connecting the anode moieties of a plurality of elements.

Accordingly, an object of the present invention is to solve the above-described problems of conventional techniques and provide a method for producing an aluminum foil for solid electrolytic capacitors, which can increase the capacitance of a solid electrolytic capacitor, ensure stable quality and elevate the productivity.

Under the circumstances, the present inventors have made extensive research on a method for producing an aluminum foil for solid electrolytic capacitors from an aluminum sheet having a non-etched surface and an aluminum sheet having an etched surface, both of which are commercially available as material sheets as aluminum foil for solid electrolytic capacitors.

As a result, the present inventors have found that in both the aluminum sheet having a non-etched surface and aluminum sheet having an etched surface, it is effective to etch a cut end portion of the aluminum foil previously cut into a form of capacitor element.

Also, they have found that in the case of the aluminum sheet having a non-etched surface, when the cut end portion formed by the cutting and the area used for the formation of an electrically conducting layer exclusive of the anode terminal on an aluminum foil previously cut into a predetermined rectangular shape is dipped in an electrolytic solution to perform the electrolytic etching and then electrochemically formed at a predetermined voltage, the entire surface can be electrochemically formed uniformly to afford increase in the capacitor capacitance and decrease in the leakage current, the anode moieties can be efficiently connected without fail on stacking elements and the productivity can be elevated.

Furthermore, they have found that in the case of the aluminum sheet having an etched surface, when only the cut end part is etched and then electrochemically formed at a predetermined voltage, the entire surface can be electrochemically formed uniformly to afford an increase in the capacitor capacitance and a decrease in the leakage current.

DISCLOSURE OF THE INVENTION

The present invention provides the following method for producing an aluminum foil for solid electrolytic capacitor, aluminum foil for solid electrolytic capacitors obtained by the method, solid electrolytic capacitor using the aluminum foil, and method for producing such a solid electrolytic capacitor.

1. A method for producing an aluminum foil for solid electrolytic capacitors, comprising the steps of cutting an aluminum foil into a shape of a capacitor element, etching a cut end part formed by said cutting, and then electrochemically forming the etched aluminum foil.
2. The method for producing an aluminum foil for solid electrolytic capacitors as described in 1 above, wherein said aluminum foil is a foil having a non-etched surface and wherein the method comprises the steps of cutting said aluminum foil into a shape of a capacitor element, etching a surface part of said aluminum foil and a cut end part formed by said cutting, and then electrochemically forming the etched aluminum foil.
3. The method for producing an aluminum foil for solid electrolytic capacitors as described in 1 above, wherein said aluminum foil is a foil having an etched surface and wherein the method comprises the steps of cutting an aluminum foil into a shape of a capacitor element, etching a cut end part formed by said cutting, and then electrochemically forming the etched aluminum foil.
4. The method for producing an aluminum foil or solid electrolytic capacitors as described in 3 above, wherein said method comprises the step of protecting the etched surface of aluminum foil with a protecting material prior to performing the etching of the cut end part.
5. The method for producing an aluminum foil for solid electrolytic capacitors as described in 4 above, wherein said method comprises the step of removing the protecting material after the etching, and electrochemically forming the surface part and cut end part of the aluminum foil simultaneously.
6. The method for producing an aluminum foil for solid electrolytic capacitors as described in 3 above, wherein said cut end part is etched such that the ratio of etching depth of cut end portion/etching depth of surface part is 1 or less.
7. The method for producing an aluminum foil for solid electrolytic capacitors as described in 1 above, wherein said etching is electrolytic etching.
8. The method for producing an aluminum foil for solid electrolytic capacitors as described in 7 above, wherein said electrolytic etching comprises dipping the aluminum foil in an electrolytic solution comprising an acidic aqueous solution mainly containing hydrochloric acid, gradually elevating an A.C. current density and then performing the A.C. electrolytic etching at a constant current.
9. The method for producing an aluminum foil for solid electrolytic capacitors as described in 8 above, wherein said electrolytic etching is A.C. etching performed under the conditions such that the frequency is from 1 to 1,000 Hz, the current density is from 0.025 to 4 $A/cm^2$ and the quantity of electricity in etching is from 0.02 to 2,000 $C/cm^2$.
10. The method for producing an aluminum foil for solid electrolytic capacitors as described in 7 above, wherein said method comprises fixing one side of each aluminum foil cut into a rectangular shape to a metal-made support to lay the aluminum foils in a row, dipping a part of the aluminum foil in an electrolytic solution to perform electrolytic etching, and then electrochemically forming the etched aluminum foil.
11. The method for producing an aluminum foil for solid electrolytic capacitors as described in 10 above, wherein said method comprises applying in advance a masking to a boundary between a portion which works out to an anode on the aluminum foil and a region where an electrically conducting layer is formed at the manufacture of a solid electrolytic capacitor.
12. The method for producing an aluminum foil for solid electrolytic capacitors as described in 1 above, wherein said aluminum foil has a thickness of 0.05 to 1 mm.
13. The method for producing an aluminum foil for solid electrolytic capacitors as described in 1 above, wherein said aluminum foil is an aluminum foil containing at least one element selected from the group consisting of Si, Fe, Cu, Ti, V and Zr.
14. The method for producing an aluminum foil for solid electrolytic capacitors as described in 13 above, wherein the content of said each element is from 1 to 100 ppm by mass.
15. The method for producing an aluminum foil for solid electrolytic capacitors as described in 13 or 14 above, wherein said aluminum foil is an aluminum foil containing from 1 to 100 ppm by mass of Si, from 1 to 100 ppm by mass of Fe and from 1 to 100 ppm by mass of Cu.

16. The method for producing an aluminum foil for solid electrolytic capacitors as described in 12 or 13 above, wherein said aluminum foil is a hard aluminum foil.

17. An aluminum foil for solid electrolytic capacitors, which is obtained by the method as described in 2 above.

18. An aluminum foil for solid electrolytic capacitors, which is obtained by the production method as described in 3 above, wherein the ratio of the etching depth in the cut end part to the etching depth in the surface part is 1 or less.

19. A solid electrolytic capacitor comprising an aluminum foil obtained by the method as described in 1 above having provided thereon in order a solid electrolyte layer and an electrically conducting layer.

20. The solid electrolytic capacitor as described in 19 above, wherein said solid electrolyte layer is a layer comprising an electrically conducting polymer.

21. The solid electrolytic capacitor as described in 20 above, wherein said electrically conducting polymer is a polymer of a monomer compound containing a 5-membered heterocyclic ring or a monomer compound having an aniline skeleton.

22. The solid electrolytic capacitor as described in 21 above, wherein said monomer compound containing a 5-membered heterocyclic ring is selected from the group consisting of pyrrole, thiophene, furan, polycyclic sulfide and substitution derivatives thereof.

23. The solid electrolytic capacitor as described in 21 above, wherein said monomer compound containing a 5-membered heterocyclic ring is a compound represented by the following formula (I):

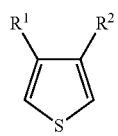

(I)

wherein the substituents $R^1$ and $R^2$ each independently represents a monovalent group selected from the group consisting of a hydrogen atom, a linear or branched, saturated or unsaturated hydrocarbon group having from 1 to 10 carbon atoms, an alkoxy group, an alkyl ester group, a halogen, a nitro group, a cyano group, a primary, secondary or tertiary amino group, a $CF_3$ group, a phenyl group and a substituted phenyl group; the hydrocarbon chains of $R^1$ and $R^2$ may combine with each other at an arbitrary position to form a divalent chain for forming at least one 3-, 4-, 5-, 6- or 7-membered saturated or unsaturated hydrocarbon ring structure together with the carbon atoms substituted by these substituents; and the ring bonding chain may optionally contain a bond such as carbonyl, ether, ester, amide, sulfide, sulfinyl, sulfonyl or imino.

24. The solid electrolytic capacitor as described in 23 above, wherein said monomer compound containing a 5-membered heterocyclic ring is a compound selected from the group consisting of 3,4-ethylenedioxythiophene and 1,3-dihydroisothianaphthene.

25. A multilayer solid electrolytic capacitor comprising a stack of a plurality of capacitor elements, each comprising an aluminum foil as described in 17 above having provided thereon in order a solid electrolyte layer and an electrically conducting layer.

26. A multilayer solid electrolytic capacitor comprising a stack of a plurality of capacitor elements, each comprising an aluminum foil as described in 18 above having provided thereon in order a solid electrolyte layer and an electrically conducting layer.

27. A method for producing a solid electrolytic capacitor, comprising the steps of forming an oxide dielectric-film on an aluminum foil for solid electrolytic capacitors, the foil being obtained by a method as described in any one of 1 to 16 above, forming a solid electrolyte on the oxide dielectric film and forming an electrical conducting material thereon.

DETAILED DESCRIPTION OF THE INVENTION

The method of the present invention is described below by referring to the attached drawings.

Aluminum:

The aluminum foil for use in the present invention is obtained by cutting (slitting) an aluminum foil in the roll form or sheet form into a predetermined shape so as to agree with the shape of a solid capacitor. The thickness thereof may be sufficient if it is large enough to ensure the strength of aluminum foil after etching; for example, the thickness is from 0.05 to 1 mm, preferably from 0.1 to 0.4 mm, and more preferably from 0.1 to 0.2 mm.

For the aluminum foil, foils of not only aluminum but also aluminum-based alloys may be used. Specific examples of the aluminum alloy include alloys of aluminum with one or more of titanium, zirconium, tantalum, niobium and hafnium.

The aluminum may be sufficient if it is an aluminum containing at least one element selected from the group consisting of Si, Fe, Cu, Ti, V and Zr, preferably containing such each element in an amount of preferably 1 to 100 mass ppm, more preferably 10 to 50 mass ppm, and most preferably from 10 to 30 mass ppm, based on the total amount of the aluminum foil.

In particular, an aluminum containing from 1 to 100 mass ppm of Si, from 1 to 100 mass ppm of Fe and from 1 to 100 mass ppm of Cu is preferred. More preferred is an aluminum containing from 10 to 50 mass ppm of Si, from 10 to 50 mass ppm of Fe and from 10 to 50 mass ppm of Cu.

The aluminum foil is changed in the properties by a heat treatment (annealing) after the rolling. The "hard foil" which is not subjected to a heat treatment is an aggregate of thin and long fibrous crystals stretched in the rolling direction. After a heat treatment by annealing at 300 to 400° C., the primary recrystallization almost completely finishes and the foil is called a "soft foil" and after annealing at 550 to 600° C., regular crystal grains are grown and this foil is a "dead soft foil". The aluminum foil for use in the present invention may be any one of those foils but is preferably a hard foil.

The cut form is not limited, however, the plate-like element unit suitably has a width of 1 to 50 mm and a length of 1 to 50 mm, preferably a width of 2 to 20 mm and a length of 2 to 20 mm, more preferably a width of 2 to 5 mm and a length of 2 to 6 mm.

Figure 1:
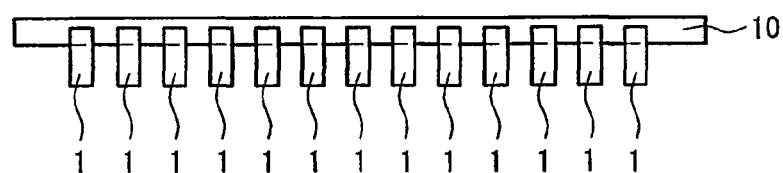
FIG. 1 is a view showing the disposition of aluminum foils fixed to a metal support in practicing the method of the present invention.

Production of Aluminum Foil for Solid Electrolytic Capacitor:

In the present invention, one side of each aluminum foil (aluminum foil having an etched surface part or aluminum foil having a non-etched surface part) (1) cut into the above-described predetermined shape is fixed to a metal-made support (10) to lay the aluminum foils in a row (FIG. 1). Alternatively, the aluminum foil is cut into a comb-like shape from which capacitor elements can be taken out and then fixed to the support.

(i) Masking

Figure 2:
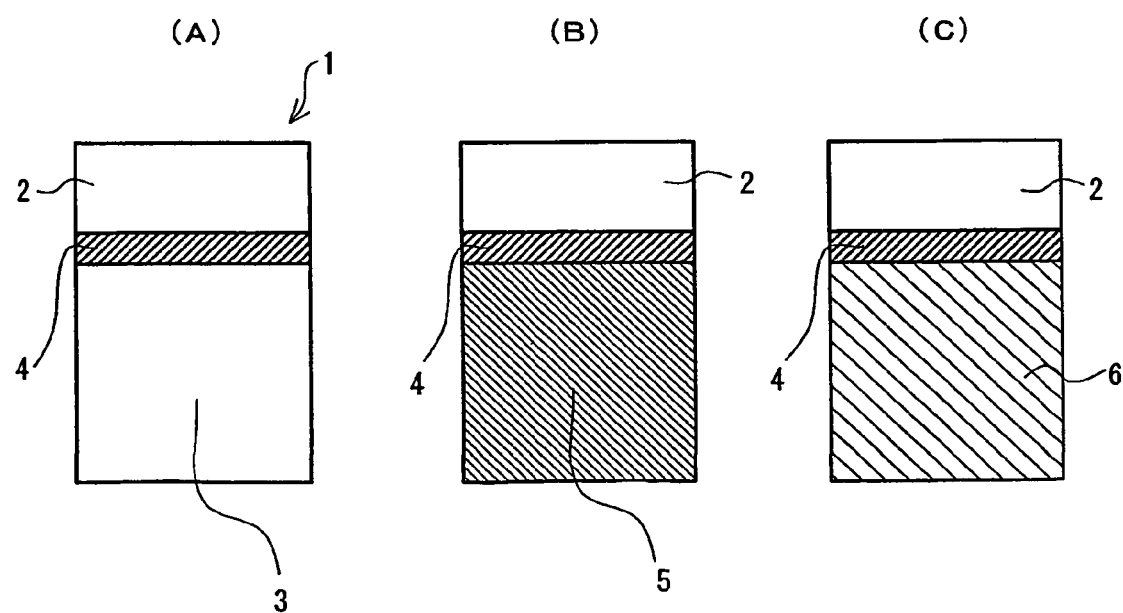
FIGS. 2(A) to 2(C) each is a view showing the production process of the aluminum foil for solid electrolytic capacitors according to the present invention.

In the present invention, as shown in FIG. 2(A), a masking (4) is preferably applied in advance to the boundary part between the part (2) working out to an anode and the region (3) used for the formation of an electrically conducting layer on the aluminum foil (1).

The masking not only has a function of insulating an electrically conducting layer (cathode moiety), which is formed later, from the anode moiety without fail but also plays a role of preventing the crawling up of processing solutions in the steps of etching, electrochemical forming, electrolyte formation and electric conductor formation.

The masking material which can be used is a general heat-resistant resin, preferably a solvent-soluble or swellable heat-resistant resin or a precursor thereof, or a composition comprising an inorganic fine powder and a cellulose-based resin (see, JP-A-11-80596).

Specific examples thereof include polyphenylsulfone (PPS), polyethersulfone (PES), cyanic acid ester resin, fluororesin (e.g., polytetrafluoroethylene, tetrafluoroethylene/ perfluoroalkyl vinyl ether copolymer), low molecular weight polyimide and derivatives thereof. Among these, low molecular weight polyimide, polyethersulfone, fluororesin and precursors thereof are preferred, and low molecular weight polyimide is more preferred.

This organic solvent is linearly coated in the form of a solution or a dispersion solution and thermally deformed to form a polymer by a heat treatment, thereby completing curing.

For the masking, a method of affixing a tape made of polypropylene, polyester, silicone-based resin or fluororesin, or a method of forming a resin coat film part may also be employed.

(ii) Electrolytic Etching

The area lower than the portion working out to an anode, preferably the area lower than the portion applied with masking, on each of aluminum foils fixed in rows to a metal-made support is etched in an electrolytic solution by dipping the area in the electrolytic solution which is prepared by adding a phosphorus acid, a sulfuric acid, a nitric acid or the like to a chlorine ion-containing aqueous solution (FIG. 2(B)).

In the case of an aluminum foil of which surface part is etched, it is preferred that the surface part after the cutting is protected with a jig having almost the same size as the surface part, whereby only the cut end surface of the non-etched part can be exposed.

The jig for protecting the etched surface part may be sufficient insofar as it can be present stably without reacting with the electrolytic solution (etching solution) and satisfactorily contact with the aluminum foil. For example, acrylic resin, polyethylene sheet and resist materials may be used. In the case of polyethylene sheet, an aluminum foil or sheet together with this polyethylene sheet previously laid to cover the entire etched surface may be cut into a predetermined size.

The aluminum foil or sheet of which etched surface is protected with a jig is dipped in an electrolytic solution to apply etching to the cut end portion.

In the etching, A.C. etching is performed under the conditions such that the frequency is from 1 to 1,000 Hz, the current density is from 0.025 to 4 A/cm$^2$ and the quantity of electricity for etching is from 0.02 to 2,000 C/cm$^2$, preferably from 0.02 to 1,000 C/cm$^2$ and more preferably from 0.02 to 500 C/cm$^2$. The A.C. electrolytic etching is preferably performed at a constant current after gradually elevating the current density of alternating current.

Also, D.C. electrolytic etching and A.C. electrolytic etching may be used in combination by performing the electrolytic etching first with D.C. and thereafter with A.C. In addition, the etching may also be performed only by D.C. electrolytic etching.

The surface enlargement may be attained by chemical etching In the chemical etching, nitric acid, ferric chloride and the like may be used.

In the case of the aluminum foil of which surface part is etched and only the cut end is exposed, the ratio of the etching depth in the cut end portion (the thickness of a fine pore formed layer (etching pit) in the foil center direction) and the etching depth in the surface part (the thickness of a fine pore formed layer in the foil thickness direction), namely, etching depth of cut end portion/etching depth of surface part, is 1 or less, preferably from 0.01 to 0.9, and more preferably from 0.05 to 0.8. For example, in the case of a 100 μm-thick aluminum foil, the etching depth in the surface part is 35 μm and the etching depth in the cut end portion is about 3 μm. Here, the etching depth is determined by observing the cross section of the foil on an electron microscope and indicated as an average value of the longest and shortest depths. If the etching depth of cut end portion/ etching depth of surface part exceeds 1, it causes dissolution or dropping out of cut end portion, therefore the capacitance decreases.

(iii) Electrochemical Forming

Subsequently, in the case of the non-etched aluminum foil, the surface part and cut end part (5), which are etched by the process above, are subjected to electrochemical forming, while in the case of the etched aluminum foil, the surface part exposed by peeling the jig and the etched cut end part (5) are to electrochemical forming (FIG. 2(C)).

The electrochemical forming can be performed by various methods. Although the conditions for the electrochemical forming are not particularly limited, the electrochemical forming is performed, for example, using an electrolytic solution containing at least one of oxalic acid, adipic acid, boric acid, phosphoric acid and the salts thereof, under conditions such that the concentration of the electrolytic solution is from 0.05 to 20% by mass, the temperature is from 0 to 90° C., the current density is from 0.1 to 600 mA/cm$^2$, the voltage is a numerical value selected according to the electrochemical forming voltage of the foil to be treated and the electrochemical forming time is 60 minutes or less. The conditions are more preferably selected within the range such that the concentration of the electrolytic solution is from 0.1 to 15% by mass, the temperature is from 20 to 70° C., the current density is from 1 to 100 mA/cm² and the electrochemical forming time is 30 minutes or less.

After the electrochemical forming, treatments such as dipping treatment in a phosphoric acid for improving the water resistance or heat treatment or dipping treatment in boiling water for elevating the film strength may be performed, if desired.

Figure 3:
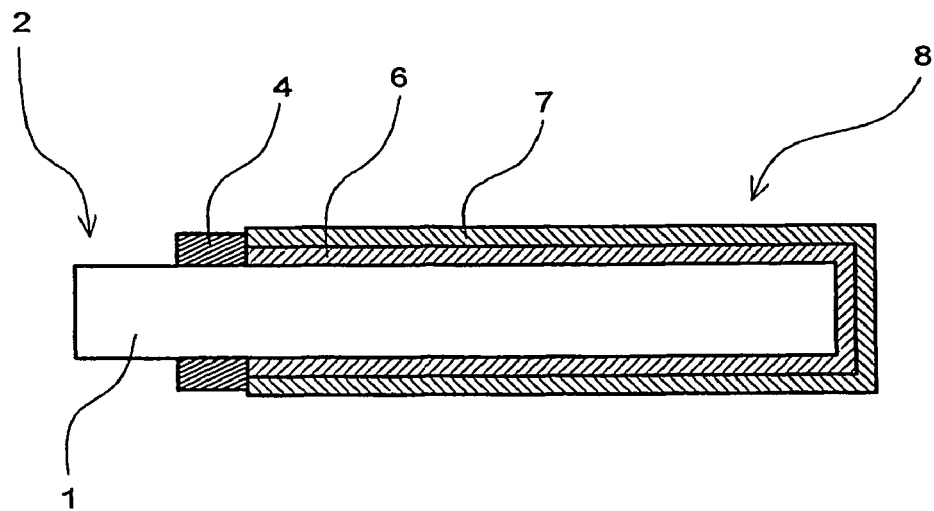
FIG. 3 is a cross section of the solid electrolytic capacitor element of the present invention.

By these treatments, the aluminum foil for solid electrolytic capacitors of the present invention is obtained. In the subsequent step, a solid electrolyte (7) which works out to a cathode layer is formed on the electrochemically formed area (6) (FIG. 3).

Formation of Solid Electrolyte:

The electrically conducting polymer for forming the solid electrolyte used in the solid electrolytic capacitor of the present invention is not limited. However, preferred examples thereof include electrically conducting polymers having a π electron-conjugate structure, such as electrically conducting polymer containing, as a repeating unit, a structure represented by a compound having a thiophene skeleton, a compound having a polycyclic sulfide skeleton, a compound having a pyrrole skeleton, a compound having a furan skeleton, a compound having an aniline skeleton or the like.

Out of the monomers used as a starting material of the electrically conducting polymer, examples of the monomer compound having a thiophene skeleton include compounds represented by the following formula (I):

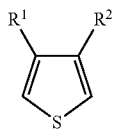

(I)

wherein the substituents $R^1$ and $R^2$ each independently represents a monovalent group selected from the group consisting of a hydrogen atom, a linear or branched, saturated or unsaturated hydrocarbon group having from 1 to 10 carbon atoms, an alkoxy group, an alkyl ester group, a halogen, a nitro group, a cyano group, a primary, secondary or tertiary amino group, a $CF_3$ group, a phenyl group and a substituted phenyl group; the hydrocarbon chains of $R^1$ and $R^2$ may combine with each other at an arbitrary position to form a divalent chain for forming at least one 3-, 4-, 5-, 6- or 7-membered saturated or unsaturated hydrocarbon ring structure together with the carbon atoms substituted by these substituents; and the ring bonding chain may optionally contain a bond such as carbonyl, ether, ester, amide, sulfide, sulfinyl, sulfonyl or imino.

Specific examples thereof include derivatives such as 3-methylthiophene, 3-ethylthiophene, 3-propylthiophene, 3-butylthiophene, 3-pentylthiophene, 3-hexylthiophene, 3-heptylthiophene, 3-octylthiophene, 3-nonylthiophene, 3-decylthiophene, 3-fluorothiophene, 3-chlorothiophene, 3-bromothiophene, 3-cyanothiophene, 3,4-dimethylthiophene, 3,4-diethylthiophene, 3,4-butylenethiophene, 3,4-methylenedioxythiophene and 3,4-ethylenedioxythiophene. These compound may be a compound generally available on the market or may be prepared by a known method (described, for example, in *Synthetic Metals,* Vol. 15, page 169 (1986)).

Examples of the monomer compound having a polycyclic sulfide skeleton include compounds represented by the following formula (II):

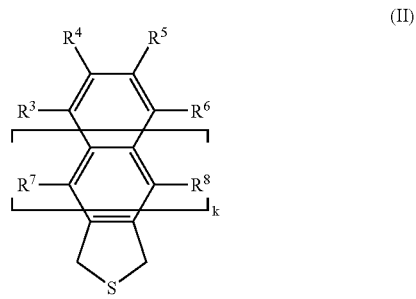

(II)

wherein the substituents $R^3$, $R^4$, $R^5$, $R^6$, $R^7$ and $R^8$ each independently represents a monovalent group selected from the group consisting of a hydrogen atom, a linear or branched, saturated or unsaturated hydrocarbon group having from 1 to 10 carbon atoms, an alkoxy group, an alkyl ester group, a halogen, a nitro group, a cyano group, a primary, secondary or tertiary amino group, a $CF_3$ group, a phenyl group and a substituted phenyl group; the hydrocarbon chains of $R^3$, $R^4$, $R^5$, $R^6$, $R^7$ and $R^8$ may combine with each other at an arbitrary position to form a divalent chain for forming at least one 3-, 4-, 5-, 6- or 7-membered saturated or unsaturated hydrocarbon ring structure together with the carbon atoms substituted by these substituents; the ring bonding chain may optionally contain a bond such as carbonyl, ether, ester, amide, sulfide, sulfinyl, sulfonyl or imino; k represents a number of condensed rings surrounded by the thiophene ring and the benzene ring having the substituents $R^3$ to $R^6$ and is an integer of 0 to 3; and the condensed ring in the formula may optionally contain nitrogen or N-oxide and in this case, the same number of substituents $R^3$ to $R^6$ as the nitrogen or N-oxide contained are missed.

Specific examples of the compound having a polycyclic sulfide skeleton which can be used include compounds having a 1,3-dihydro-polycyclic sulfide (also called 1,3-dihydrobenzo[c]thiophene) skeleton, and compounds having a 1,3dihydronaphtho[2,3-c]thiophene skeleton. Other examples include compounds having a 1,3-dihydroanthra[2,3-c]thiophene skeleton, and compounds having a 1,3-dihydronaphthaceno[2,3-c]thiophene skeleton. These compounds can be prepared by a known method, for example, the method described in JP-A-8-3156.

In addition, compounds having a 1,3-dihydronaphtho-[1,2-c]thiophene skeleton, 1,3-dihydrophenanthra[2,3-c]thiophene derivatives, compounds having a 1,3-dihydrotriphenylo[2,3-c]thiophene skeleton, 1,3-dihydrobenzo[a]anthraceno[7,8-c]thiophene derivatives and the like may also be used.

Some compounds optionally contain nitrogen or N-oxide in the condensed ring and examples thereof include 1,3-dihydrothieno[3,4-b]quinoxaline, 1,3-dihydrothieno[3,4-b]-quinoxaline-4-oxide and 1,3-dihydrothieno[3,4-b]quinoxaline-4,9-dioxide. However, the present invention is not limited thereto.

Examples of the monomer compound having a pyrrole skeleton include compounds represented by the following formula (III):

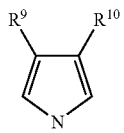

wherein the substituents $R^9$ and $R^{10}$ each independently represents a monovalent group selected from the group consisting of a hydrogen atom, a linear or branched, saturated or unsaturated hydrocarbon group having from 1 to 10 carbon atoms, an alkoxy group, an alkyl ester group, a halogen, a nitro group, a cyano group, a primary, secondary or tertiary amino group, a $CF_3$ group, a phenyl group and a substituted phenyl group; the hydrocarbon chains of $R^9$ and $R^{10}$ may combine with each other at an arbitrary position to form a divalent chain for forming at least one 3-, 4-, 5-, 6- or 7-membered saturated or unsaturated hydrocarbon ring structure together with the carbon atoms substituted by these substituents; and the ring bonding chain may optionally contain a bond such as carbonyl, ether, ester, amide, sulfide, sulfinyl, sulfonyl or imino.

Specific examples thereof include derivatives such as 3-methylpyrrole, 3-ethylpyrrole, 3-propylpyrrole, 3-butylpyrrole, 3-pentylpyrrole, 3-hexylpyrrole, 3-heptylpyrrole, 3-octylpyrrole, 3-nonylpyrrole, 3-decylpyrrole, 3-fluoropyrrole, 3-chloropyrrole, 3-bromopyrrole, 3-cyanopyrrole, 3,4-dimethylpyrrole, 3,4-diethylpyrrole, 3,4-butylenepyrrole, 3,4-methylenedioxypyrrole and 3,4-ethylenedioxypyrrole. However, the present invention is not limited thereto. These compounds may be commercially available or may be prepared by a known method.

Examples of the monomer compound having a furan skeleton include compounds represented by the following formula (IV):

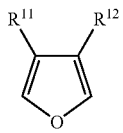

wherein the substituents $R^{11}$ and $R^{12}$ each independently represents a monovalent group selected from the group consisting of a hydrogen atom, a linear or branched, saturated or unsaturated hydrocarbon group having from 1 to 10 carbon atoms, an alkoxy group, an alkyl ester group, a halogen, a nitro group, a cyano group, a primary, secondary or tertiary amino group, a $CF_3$ group, a phenyl group and a substituted phenyl group; the hydrocarbon chains of $R^{11}$ and $R^{12}$ may combine with each other at an arbitrary position to form a divalent chain for forming at least one 3-, 4-, 5-, 6- or 7-membered saturated or unsaturated hydrocarbon ring structure together with the carbon atoms substituted by these substituents; and the ring bonding chain may optionally contain a bond such as carbonyl, ether, ester, amide, sulfide, sulfinyl, sulfonyl or imino.

Specific examples thereof include derivatives such as 3-methylfuran, 3-ethylfuran, 3-propylfuran, 3-butylfuran, 3-pentylfuran, 3-hexylfuran, 3-heptylfuran, 3-octylfuran, 3-nonylfuran, 3-decylfuran, 3-fluorofuran, 3-chlorofuran, 3-bromofuran, 3-cyanofuran, 3,4-dimethylfuran, 3,4-diethylfuran, 3,4-butylenefuran, 3,4-methylenedioxyfuran and 3,4-ethylenedioxyfuran. However, the present invention is not limited thereto. These compounds may be commercially available or may be prepared by a known method.

Examples of the monomer compound having an aniline skeleton include compounds represented by the following formula (V):

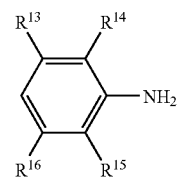

wherein the substituents $R^{13}$, $R^{14}$, $R^{15}$ and $R^{16}$ each independently represents a monovalent group selected from the group consisting of a hydrogen atom, a linear or branched, saturated or unsaturated hydrocarbon group having from 1 to 10 carbon atoms, an alkoxy group, an alkyl ester group, a halogen, a nitro group, a cyano group, a primary, secondary or tertiary amino group, a $CF_3$ group, a phenyl group and a substituted phenyl group; the hydrocarbon chains of $R^{13}$, $R^{14}$, $R^{15}$ and $R^{16}$ may combine with each other at an arbitrary position to form a divalent chain for forming at least one 3-, 4-, 5-, 6- or 7-membered saturated or unsaturated hydrocarbon ring structure together with the carbon atoms substituted by these substituents; and the ring bonding chain may optionally contain a bond such as carbonyl, ether, ester, amide, sulfide, sulfinyl, sulfonyl or imino.

Specific examples thereof include derivatives such as 2-methylaniline, 2-ethylaniline, 2-propylaniline, 2-butylaniline, 2-pentylaniline, 2-hexylaniline, 2-heptylaniline, 2-octylaniline, 2-nonylaniline, 2-decylaniline, 2-fluoroaniline, 2-chloroaniline, 2-bromoaniline, 2-cyanoaniline, 2,5-dimethylaniline, 2,5-diethylaniline, 2,3-butyleneaniline, 2,3-methylenedioxyaniline and 2,3-ethylenedioxyaniline. However, the present invention is not limited thereto. These compounds may be commercially available or may be prepared by a known method.

Also, monomer compounds selected from the above-described compounds may be used in combination and polymerized into a copolymer of forming the solid electrolyte. At this time, the composition ratio of polymerizable monomers, and the like depend on the polymerization conditions, however, a preferred composition ratio and preferred polymerization conditions may be confirmed by a simple test. For example, a method of coating a monomer and an oxidizing agent each preferably in the form of a solution, separately one after another or simultaneously on an oxide film layer of a metal foil to form a solid electrolyte (see, JP-A-2-15611 (U.S. Pat. No. 4,910,645) and JP-A-10-32145 (U.S. Pat. No. 6,229,689)) may be used. In the electrically conducting polymer, an arylsulfonate-type dopant can be generally used. For example, a salt of benzenesulfonic acid, toluenesulfonic acid, naphthalenesulfonic acid, anthracenesulfonic acid or anthraquinonesulfonic acid can be used as a dopant donating agent.

Figure 4:
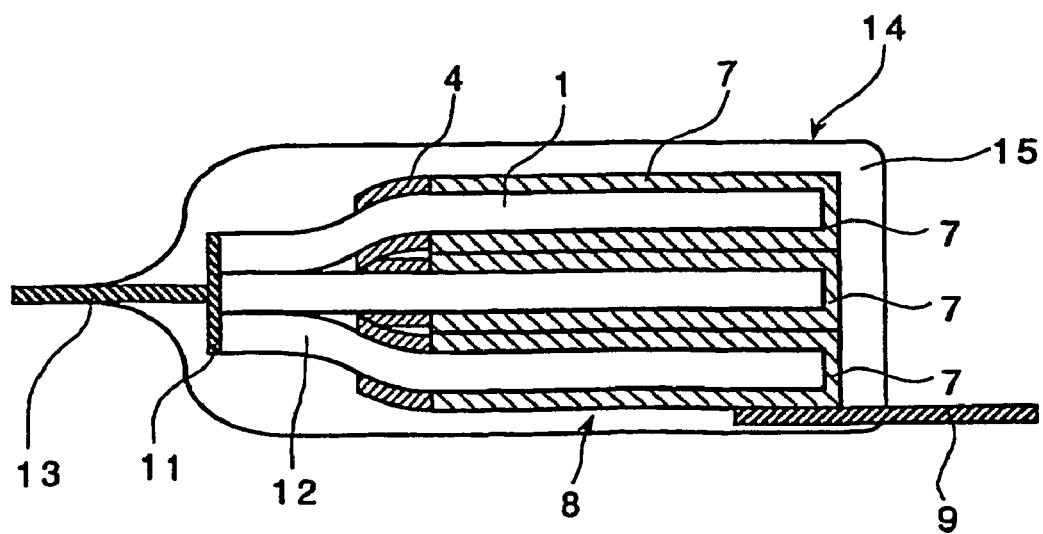
FIG. 4 is a cross sectional view showing an example of the multilayer solid electrolytic capacitor fabricated from the solid electrolytic capacitor elements of the present invention.

On the surface of the solid electrolyte layer (7), a carbon paste layer and a metal powder-containing electrically conducting layer are provided to form a cathode moiety (8) of a capacitor (FIG. 3). The metal powder-containing electrically conducting layer closely adheres to the solid electrolyte layer and acts as a cathode and at the same time, works out to an adhesive layer for bonding a cathode lead terminal (9) of the final capacitor product (FIG. 4). The thickness of the metal powder-containing electrically conducting layer is not limited. However, it is generally on the order of 10 to 100 μm, and preferably on the order of 10 to 50 μm.

The capacitor of the present invention is generally used as a multilayer capacitor where for example, at least two sheets of elements are stacked. In the multilayer solid electrolytic capacitor, the lead frame (11) may be chamfered, more specifically, the lead frame may have flattened or rounded edge corner parts by slightly shaving these parts.

The opposing cathode bonding part and anode bonding part of the lead frame may be allowed to play a role of lead terminals (9) and (13).

The material for the lead frame is not particularly limited insofar as it is a material commonly used. However, the lead frame is preferably constructed by a copper-based material (for example, Cu—Ni based, Cu—Ag based, Cu—Sn based, Cu—Fe based, Cu—Ni—Ag based, Cu—Ni—Sn based, Cu—Co—P based, Cu—Zn—Mg based or Cu—Sn—Ni—P based alloy) or a material of which surface is plated with a copper-based material. By constructing as such, the resistance can be reduced by designing the shape of the lead frame or good workability can be attained in chamfering the lead frame.

As shown in the cross section of FIG. 4, a lead terminal (13) is connected to the lead frame (11) bonded to the anode moiety (12), a lead wire (9) is connected to the cathode moiety (8) consisting of the solid electrolyte layer (7), the carbon paste layer and the metal powder-containing electrically conducting layer, and the device as a whole is molded with an insulating resin (15) such as epoxy resin, whereby a solid electrolytic capacitor (14) is obtained.

The advantageous effects obtained by the present invention are described below.

(1) Since the etching and the electrochemical forming are performed after aluminum is previously cut into a size corresponding to the element, the etching and the electrochemical forming can be uniformly applied also to the cut end portion. As a result, the leakage current from the cut edge part is greatly reduced, the formation of solid electrolyte uniformly proceeds, and the adherence of polymer is facilitated. By virtue of the uniform formation of film and the uniform adhesion of polymer, the produced capacitor is decreased in ESR and the yield of capacitor is improved overall.

(2) The etching of aluminum can be designed by the thickness required and therefore, the capacitor can have any large capacitance.

(3) In the case where an aluminum foil having a non-etched surface is used, since application of masking in advance to the boundary between the portion which works out to an anode on the aluminum foil and the region where an electrically conducting layer is formed at the manufacture of a solid electrolytic capacitor prevents the anode moiety from being subjected to the etching and to the electrochemical forming, the anode moiety can be effectively bonded in the fabrication of a multilayer capacitor and almost no electric resistance is generated by the stacking of the anode moiety. If etching pits are present in the anode moiety, a liquid rising of solution as a capillary phenomenon occurs at the time of forming an electrically conducting layer and the electrically conducting polymer is readily formed and attached. Therefore, the selection of masking agent has been difficult. However, according to the method of the present invention, the liquid rising does not occur because the anode moiety is not etched and as a result, attachment of the solid electrolyte and short circuit are get rid of and moreover, the leakage current is reduced.

(4) In the case where commercially available etched aluminum foils, adjusting the etching depth of cut end part such that the etching depth of cut end portion/etching depth of surface part to 1 or less, results in that the etching and the electrochemical forming can be uniformly applied also to the cut end portion. As a result, the leakage current from the cut edge part is greatly reduced, the formation of solid electrolyte uniformly proceeds, and the adherence of polymer is facilitated. By virtue of the uniform formation of film and the uniform adhesion of polymer, the produced capacitor is decreased in ESR and the yield of capacitor is improved overall. If the etching depth of cut end portion/ etching depth of surface part exceeds 1, it causes dissolution or dropping out of cut end portion, therefore the electrostatic capacitance decreases.

BEST MODE FOR CARRYING OUT THE INVENTION

The present invention is described in greater detail below by referring to its representative examples. However, these are mere examples and the present invention should not be construed as being limited thereto.

EXAMPLES 1 TO 9

Masking Process

A 150 μm-thick aluminum foil having a non-etched surface (containing Si: 20 ppm by mass, Fe: 24 ppm by mass, Cu: 33 ppm by mass and Ti: 0.9 ppm by mass) cut (slit) into a width of 3 mm was cut out into pieces having a length of 13 mm. One short side of the foil piece was fixed to a metal-made guide and in the range of 4 to 5 mm from the edge not fixed, a tape consisting of a heat resistant substrate and a heat resistant adhesive was affixed onto the the aluminum foil circumferentially to a width of 1 mm.

Etching Treatment

The area from the distal end to the masking line on the aluminum foil fixed to a metal-made guide was dipped in a first electrolytic solution (an aqueous solution containing 10% hydrochloric acid+0.5% sulfuric acid) at 60° C. and in a second electrolytic solution (an aqueous solution containing 10% hydrochloric acid+1.5% sulfuric acid) at 35° C., then subjected to an A.C. electrolytic etching under the conditions of frequency, current density and quantity of electricity shown in Table 1 and further chemically etched with an aqueous 3% nitric acid solution.

Electrochemical Forming

The area from the distal end to the masking line on the aluminum foil fixed to a metal-made guide was dipped in an aqueous ammonium adipate solution and the electrochemically unformed area was electrochemically formed by applying a voltage of 13 V to form a dielectric film.

Formation of Solid Electrolyte

A solid electrolyte was formed in the electrochemically formed region as follows.

The area (3 mm×4 mm) over 4 mm from the distal end of the aluminum foil in the opposite side to the masking layer and separated by the masking layer was dipped in an isopropanol solution (Solution 1) containing 20% by mass of 3,4-ethylenedioxythiophene, then pulled up and left standing at 25° C. for 5 minutes. Subsequently, the aluminum foil in the area treated with the monomer solution was dipped in an aqueous solution (Solution 2) containing 30% by mass of an aqueous ammonium persulfate solution prepared to have a sodium 2-anthraquinonesulfonate (produced by Tokyo Kasei) concentration of 0.07% by mass, and then dried at 60° C. for 10 minutes to allow the oxidation polymerization to proceed. The operation of dipping the aluminum foil in Solution 1 and then in Solution 2 to perform the oxidation polymerization was repeated 25 times to form a solid electrolyte layer. The aluminum foil was cut out from the metal-made guide to obtain a solid electrolytic capacitor element shown in FIG. 3.

Construction and Test of Chip Multilayer Solid Electrolytic Capacitor Device

Three sheets of solid electrolytic capacitor elements were stacked while bonding the portion including the masking layer onto a lead frame with silver paste, and an anode lead terminal was connected by welding to the portion not having the electrically conducting polymer. The obtained device as a whole was molded with an epoxy resin and aged at 120° C. for 2 hours by applying a rating voltage. In this manner, 30 units in total of each capacitor were manufactured. FIG. 4 shows a cross section of the manufactured multilayer solid electrolytic capacitor.

This multilayer solid electrolytic capacitor was subjected to a reflow soldering test by passing the capacitor through a temperature zone of 230° C. over 30 seconds. The leakage current was measured 1 minute after the application of the rated voltage and an average leakage current value (μA) of devices having a measured value of 1 CV or less was obtained. The devices of 0.04 CV or more were judged defective and the "number of defective units/number of units evaluated" was determined and designated as a reflow soldering heat resistance defective ratio. The results are shown in Table 2.

EXAMPLE 10

A multilayer solid electrolytic capacitor was manufactured in the same manner as in Example 1 except that in place of the tape for masking, a polyimide resin solution (Rikacoat™, produced by Shin Nihon Rika K. K.) adjusted to a viscosity of 800 cp was fed to a disk-like coating apparatus (no shown) having a coating surface width of 0.4 mm, linearly drawn to a width of 0.8 mm by abutting and pressing the coating surface of the coating apparatus against the entire circumference of the electrochemically formed aluminum foil and then dried at about 180° C. to form a masking layer (polyimide film). The measurement of leakage current and the reflow soldering test were performed in the same manner. The results obtained are shown in Table 2.

EXAMPLE 11

A multilayer solid electrolytic capacitor was manufactured in the same manner as in Example 3 except for changing the thickness of the aluminum foil from 150 μm to 300 μm, and the measurement of leakage current and the reflow soldering test were performed in the same manner. The results obtained are shown in Table 2.

EXAMPLE 12

A multilayer solid electrolytic capacitor was manufactured in the same manner as in Example 6 except for changing the thickness of the aluminum foil from 150 μm to 300 μm, and the measurement of leakage current and the reflow soldering test were performed in the same manner. The results obtained are shown in Table 2.

EXAMPLE 13

A multilayer solid electrolytic capacitor was manufactured in the same manner as in Example 9 except for changing the thickness of the aluminum foil from 150 μm to 300 μm, and the measurement of leakage current and the reflow soldering test were performed in the same manner. The results obtained are shown in Table 2.

EXAMPLE 14

30 Units of capacitors were completed in the same manner as in Example 1 except for using ferric sulfate in place of ammonium persulfate and using 1,3-dihydroisothianaphthene in place of 3,4-ethylenedioxythiophene in Example 1. These capacitor devices were evaluated on the properties in the same manner as in Example 1. The results obtained are shown in Table 2.

EXAMPLE 15

30 Units of capacitors were completed in the same manner as in Example 1 except for using pyrrole in place of 3,4-ethylenedioxythiophene in Example 1. These capacitor devices were evaluated on the properties in the same manner as in Example 1. The results obtained are shown in Table 2.

EXAMPLE 16

30 Units of capacitors were fabricated in the same manner as in Example 1 except for using furan in place of 3,4-ethylenedioxythiophene in Example 1. These capacitor devices were evaluated on the properties in the same manner as in Example 1. The results obtained are shown in Table 2.

EXAMPLE 17

30 Units of capacitors were fabricated in the same manner as in Example 1 except for using aniline in place of 3,4-ethylenedioxythiophene in Example 1. These capacitor devices were evaluated on the properties in the same manner as in Example 1. The results obtained are shown in Table 2.

COMPARATIVE EXAMPLE 1

A multilayer solid electrolytic capacitor was manufactured in the same manner as in Example 1 except for using a commercially available electrochemically formed aluminum foil in place of the aluminum foil and omitting the etching treatment, and the measurement of leakage current and the reflow soldering test were performed in the same manner. The results obtained are shown in Table 2.

TABLE 1

|  | Frequency (Hz) | Current Density (A/cm²) | Quantity of Electricity (C/Device**) | Electrostatic Capacitance* (%) | Thickness of Foil (μm) |
|---|---|---|---|---|---|
| Example 1 | 30 | 0.1 | 70 | 140 | 150 |
| Example 2 | 30 | 1 | 70 | 138 | 150 |
| Example 3 | 30 | 0.5 | 70 | 140 | 150 |
| Example 4 | 100 | 0.1 | 70 | 138 | 150 |
| Example 5 | 100 | 1 | 70 | 139 | 150 |
| Example 6 | 100 | 0.5 | 70 | 140 | 150 |
| Example 7 | 1000 | 0.1 | 70 | 141 | 150 |
| Example 8 | 1000 | 1 | 70 | 142 | 150 |
| Example 9 | 1000 | 0.5 | 70 | 140 | 150 |
| Example 10 | 30 | 0.1 | 70 | 140 | 150 |
| Example 11 | 30 | 0.5 | 150 | 220 | 300 |
| Example 12 | 100 | 0.5 | 150 | 225 | 300 |
| Example 13 | 1000 | 0.5 | 150 | 223 | 300 |
| Comparative Example 1 | commercially available electrochemically formed foil | | | 100 | 100 |

*A relative value to the electrostatic capacitance per device (3 mm × 4 mm) in Comparative Example 1 which is taken as 100.
**Area of capacitor device is 3 mm × 4 mm.

TABLE 2

|  | Average Leakage Current (μA) | Reflow Soldering Heat Resistance Defective Ratio (number of defective units/number of units evaluated) |
|---|---|---|
| Example 1 | 0.20 | 0/30 |
| Example 2 | 0.19 | 0/30 |
| Example 3 | 0.17 | 0/30 |
| Example 4 | 0.16 | 0/30 |
| Example 5 | 0.16 | 0/30 |
| Example 6 | 0.17 | 0/30 |
| Example 7 | 0.15 | 0/30 |
| Example 8 | 0.16 | 0/30 |
| Example 9 | 0.17 | 0/30 |
| Example 10 | 0.16 | 0/30 |
| Example 11 | 0.30 | 0/30 |
| Example 12 | 0.30 | 0/30 |
| Example 13 | 0.30 | 0/30 |
| Example 14 | 0.22 | 0/30 |
| Example 15 | 0.18 | 0/30 |
| Example 16 | 0.17 | 0/30 |
| Example 17 | 0.18 | 0/30 |
| Comparative Example 1 | 2.0 | 4/30 |

EXAMPLES 18 TO 26

Masking Process

A 150 μm-thick etched aluminum foil (containing Si: 20 ppm by mass, Fe: 24 ppm by mass, Cu: 33 ppm by mass and Ti: 0.9 ppm by mass) cut (slit) into a width of 3 mm was cut out into pieces having a length of 13 mm. One short side of the foil piece was fixed to a metal-made guide and in the range of 4 to 5 mm from the edge not fixed, a tape consisting of a heat resistant substrate and a heat resistant adhesive was affixed onto the aluminum foil circumferentially to a width of 1 mm.

Etching Treatment

After covering the etched surface with a polyethylene sheet, the area from the distal end to the masking line on the aluminum foil was dipped in a first electrolytic solution (an aqueous solution containing 10% by mass of hydrochloric acid+0.5% by mass of sulfuric acid) at 60° C., then subjected to an A.C. electrolytic etching of the cut end part under the conditions of frequency, current density and quantity of electricity shown in Table 3 and further chemically etched with an aqueous 3% by mass nitric acid solution.

Electrochemical Forming

After removing the polyethylene sheet, the area from the distal end to the masking line on the aluminum foil was dipped in an aqueous ammonium adipate solution and the electrochemically unformed area was electrochemically formed by applying a voltage of 13 V to form a dielectric film.

Formation of Solid Electrolyte

A solid electrolyte was formed in the electrochemically formed region as follows.

The area (3 mm×4 mm) over 4 mm from the distal end of the aluminum foil in the opposite side to the masking layer and separated by the masking layer was dipped in an isopropanol solution (Solution 1) containing 20% by mass of 3,4-ethylenedioxythiophene, then pulled up and left standing at 25° C. for 5 minutes. Subsequently, the aluminum foil in the area treated with the monomer solution was dipped in an aqueous solution (Solution 2) containing 30% by mass of an aqueous ammonium persulfate solution prepared to have a sodium 2-anthraquinonesulfonate (produced by Tokyo Kasei) concentration of 0.07% by mass, and then dried at 60° C. for 10 minutes to allow the oxidation polymerization to proceed. The operation of dipping the aluminum foil in Solution 1 and then in Solution 2 to perform the oxidation polymerization was repeated 25 times to form a solid electrolyte layer. The aluminum foil was cut out from the metal-made guide to obtain a solid electrolytic capacitor element shown in FIG. 3.

Construction and Test of Chip Multilayer Solid Electrolytic Capacitor Device

Three sheets of solid electrolytic capacitor elements were stacked while bonding the portion including the masking layer onto a lead frame with silver paste, and an anode lead terminal was connected by welding to the portion not having the electrically conducting polymer. The obtained device as a whole was molded with an epoxy resin and aged at 120° C. for 2 hours by applying a rating voltage. In this manner, 30 units in total of each capacitor were manufactured. FIG. 4 shows a cross section of the manufactured multilayer solid electrolytic capacitor.

This multilayer solid electrolytic capacitor was subjected to a reflow soldering test by passing the capacitor through a temperature zone of 230° C. over 30 seconds. The leakage current was measured 1 minute after the application of the rated voltage and an average leakage current value (μA) of devices having a measured value of 1 CV or less was obtained. The devices of 0.04 CV or more were judged defective and the "number of defective units/number of units evaluated" was determined and designated as a reflow soldering heat resistance defective ratio. The results are shown in Table 4.

EXAMPLE 27

A multilayer solid electrolytic capacitor was manufactured in the same manner as in Example 20 except for changing the thickness of the aluminum foil from 150 μm to 300 μm, and the measurement of leakage current and the reflow soldering test were performed in the same manner. The results obtained are shown in Table 4.

EXAMPLE 28

A multilayer solid electrolytic capacitor was manufactured in the same manner as in Example 23 except for changing the thickness of the aluminum foil from 150 μm to 300 μm, and the measurement of leakage current and the reflow soldering test were performed in the same manner. The results obtained are shown in Table 4.

EXAMPLE 29

A multilayer solid electrolytic capacitor was manufactured in the same manner as in Example 26 except for changing the thickness of the aluminum foil from 150 μm to 300 μm, and the measurement of leakage current and the reflow soldering test were performed in the same manner. The results obtained are shown in Table 4.

EXAMPLE 30

30 Units of capacitors were completed in the same manner as in Example 18 except for using pyrrole in place of 3,4-ethylenedioxythiophene in Example 18. These capacitor devices were evaluated on the properties in the same manner as in Example 18. The results obtained are shown in Table 4.

EXAMPLE 31

30 Units of capacitors were fabricated in the same manner as in Example 18 except for using furan in place of 3,4-ethylenedioxythiophene in Example 18. These capacitor devices were evaluated on the properties in the same manner as in Example 18. The results obtained are shown in Table 4.

EXAMPLE 32

30 Units of capacitors were fabricated in the same manner as in Example 18 except for using aniline in place of 3,4-ethylenedioxythiophene in Example 18. These capacitor devices were evaluated on the properties in the same manner as in Example 18. The results obtained are shown in Table 4.

COMPARATIVE EXAMPLE 2

A multilayer solid electrolytic capacitor was manufactured in the same manner as in Example 18 except for using a commercially available electrochemically formed aluminum foil in place of the aluminum foil and omitting the etching treatment of the cut end portion, and the measurement of leakage current and the reflow soldering test were performed in the same manner. The results obtained are shown in Table 4.

TABLE 3

| | Frequency (Hz) | Current Density (A/cm$^2$) | Quantity of Electricity (C/Device**) | Electrostatic Capacitance* (%) | Thickness of Foil (μm) |
|---|---|---|---|---|---|
| Example 18 | 30 | 0.1 | 0.025 | 140 | 150 |
| Example 19 | 30 | 1 | 0.25 | 141 | 150 |
| Example 20 | 30 | 0.5 | 2.5 | 143 | 150 |
| Example 21 | 100 | 0.1 | 0.025 | 139 | 150 |
| Example 22 | 100 | 1 | 0.25 | 140 | 150 |

TABLE 3-continued

| | Frequency (Hz) | Current Density (A/cm$^2$) | Quantity of Electricity (C/Device**) | Electrostatic Capacitance* (%) | Thickness of Foil (μm) |
|---|---|---|---|---|---|
| Example 23 | 100 | 0.5 | 2.5 | 143 | 150 |
| Example 24 | 50 | 0.1 | 2.5 | 142 | 150 |
| Example 25 | 50 | 1 | 5 | 143 | 150 |
| Example 26 | 50 | 0.1 | 10 | 140 | 150 |
| Example 27 | 30 | 0.5 | 0.25 | 222 | 300 |
| Example 28 | 100 | 0.5 | 25 | 223 | 300 |
| Example 29 | 50 | 0.1 | 10 | 220 | 300 |
| Comparative Example 2 | commercially available electrochemically formed foil | | | 100 | 100 |

*A relative value to the electrostatic capacitance per device (3 mm × 4 mm) in Comparative Example 2 which is taken as 100.
**Area of capacitor device is 3 mm × 4 mm.

TABLE 4

| | Average Leakage Current (μA) | Reflow Soldering Heat Resistance Defective Ratio (number of defective units/number of units evaluated) |
|---|---|---|
| Example 18 | 0.19 | 0/30 |
| Example 19 | 0.18 | 0/30 |
| Example 20 | 0.16 | 0/30 |
| Example 21 | 0.15 | 0/30 |
| Example 22 | 0.16 | 0/30 |
| Example 23 | 0.16 | 0/30 |
| Example 24 | 0.14 | 0/30 |
| Example 25 | 0.15 | 0/30 |
| Example 26 | 0.16 | 0/30 |
| Example 27 | 0.15 | 0/30 |
| Example 28 | 0.16 | 0/30 |
| Example 29 | 0.15 | 0/30 |
| Example 30 | 0.20 | 0/30 |
| Example 31 | 0.28 | 0/30 |
| Example 32 | 0.30 | 0/30 |
| Comparative Example 2 | 2.0 | 4/30 |

The invention claimed is:

1. A method for producing an aluminum foil for solid electrolytic capacitors, comprising the steps of cutting an aluminum foil into a shape of a capacitor element, etching a cut end part formed by said cutting, and then electrochemically forming the etched aluminum foil.

2. The method for producing an aluminum foil for solid electrolytic capacitors as claimed in claim 1, wherein said aluminum foil is a foil having a non-etched surface and wherein the method comprises the steps of cutting said aluminum foil into a shape of a capacitor element, etching a surface part of said aluminum foil and a cut end part formed by said cutting, and then electrochemically forming the etched aluminum foil.

3. An aluminum foil for solid electrolytic capacitors, which is obtained by the method as claimed in claim 2.

4. A multilayer solid electrolytic capacitor comprising a stack of a plurality of capacitor elements, each comprising an aluminum foil as claimed in claim 3 having provided thereon in order a solid electrolyte layer and an electrically conducting layer.

5. The method for producing an aluminum foil for solid electrolytic capacitors as claimed in claim 1, wherein said aluminum foil is a foil having an etched surface and wherein the method comprises the steps of cutting an aluminum foil into a shape of a capacitor element, etching a cut end part formed by said cutting, and then electrochemically forming the etched aluminum foil.

6. The method for producing an aluminum foil for solid electrolytic capacitors as claimed in claim 5, wherein said method comprises the step of protecting the etched surface of aluminum foil with a protecting material prior to performing the etching of the cut end part.

7. The method for producing an aluminum foil for solid electrolytic capacitors as claimed in claim 6, wherein said method comprises the step of removing the protecting material after the etching, and electrochemically forming the surface part and cut end part of the aluminum foil simultaneously.

8. The method for producing an aluminum foil for solid electrolytic capacitors as claimed in claim 5, wherein said cut end part is etched such that the ratio of etching depth of cut end portion/etching depth of surface part is 1 or less.

9. An aluminum foil for solid electrolytic capacitors, which is obtained by the production method as claimed in claim 5, wherein the ratio of the etching depth in the cut end part to the etching depth in the surface part is 1 or less.

10. A multilayer solid electrolytic capacitor comprising a stack of a plurality of capacitor elements, each comprising an aluminum foil as claimed in claim 9 having provided therein in order a solid electrolyte layer and an electrically conducting layer.

11. The method for producing an aluminum foil for solid electrolytic capacitors as claimed in claim 1, wherein said etching is electrolytic etching.

12. The method for producing an aluminum foil for solid electrolytic capacitors as claimed in claim 11, wherein said electrolytic etching comprises dipping the aluminum foil in an electrolytic solution comprising an acidic aqueous solution mainly containing hydrochloric acid, gradually elevating an A.C. current density and then performing the A.C. electrolytic etching at a constant current.

13. The method for producing an aluminum foil for solid electrolytic capacitors as claimed in claim 12, wherein said electrolytic etching is A.C. etching performed under the conditions such that the frequency is from 1 to 1,000 Hz, the current density is from 0.025 to 4 A/cm$^2$ and the quantity of electricity in etching is from 0.02 to 2,000 C/cm$^2$.

14. The method for producing an aluminum foil for solid electrolytic capacitors as claimed in claim 11, wherein said method comprises fixing one side of each aluminum foil cut into a rectangular shape to a metal-made support to lay the aluminum foils in a row, dipping a part of the aluminum foil in an electrolytic solution to perform electrolytic etching, and then electrochemically forming the etched aluminum foil.

15. The method for producing an aluminum foil for solid electrolytic capacitors as claimed in claim 14, wherein said method comprises applying in advance a masking to a boundary between a portion which works out to an anode on the aluminum foil and a region where an electrically conducting layer is formed at the manufacture of a solid electrolytic capacitor.

16. The method for producing an aluminum foil for solid electrolytic capacitors as claimed in claim 1, wherein said aluminum foil has a thickness of 0.05 to 1 mm.

17. The method for producing an aluminum foil for solid electrolytic capacitors as claimed in claim 1, wherein said aluminum foil is an aluminum foil containing at least one element selected from the group consisting of Si, Fe, Cu, Ti, V and Zr.

18. The method for producing an aluminum foil for solid electrolytic capacitors as claimed in claim 17, wherein the content of said each element is from 1 to 100 ppm by mass.

19. The method of producing an aluminum foil for solid electrolytic capacitors as claimed in claim 17, wherein said aluminum foil is an aluminum foil containing from 1 to 100 ppm by mass of Si, from 1 to 100 ppm by mass of Fe and from 1 to 100 ppm by mass of Cu.

20. The method for producing an aluminum foil for solid electrolytic capacitors as claimed in claim 16, wherein said aluminum foil is a hard aluminum foil.

21. A solid electrolytic capacitor comprising an aluminum foil obtained by the method as claimed in claim 1 having provided therein in order a solid electrolyte layer and an electrically conducting layer.

22. The solid electrolytic capacitor as claimed in claim 21, wherein said solid electrolyte layer is a layer comprising an electrically conducting polymer.

23. The solid electrolytic capacitor as claimed in claim 22, wherein said electrically conducting polymer is a polymer of a monomer compound containing a 5-membered heterocyclic ring or a monomer compound having an aniline skeleton.

24. The solid electrolytic capacitor as claimed in claim 23, wherein said monomer compound containing a 5-membered heterocyclic ring is selected from the group consisting of pyrrole, thiophene, furan, polycyclic sulfide and substitution derivatives thereof.

25. The solid electrolytic capacitor as claimed in clam 23, wherein said monomer compound containing a 5-membered heterocyclic ring is a compound represented by the following formula (I):

wherein the substituents $R^1$ and $R^2$ each independently represents a monovalent group selected from the group consisting of a hydrogen atom, a linear or branched, saturated or unsaturated hydrocarbon group having from 1 to 10 carbon atoms, an alkoxy group, an alkyl ester group, a halogen, a nitro group, a cyano group, a primary, secondary or tertiary amino group, a $CF_3$ group, a phenyl group and a substituted phenyl group; the hydrocarbon chains of $R^1$ and $R^2$ may combine with each other at an arbitrary position to form a divalent chain for forming at least one 3-, 4-, 5-, 6- or 7-membered saturated or unsaturated hydrocarbon ring structure together with the carbon atoms substituted by these substituents; and the ring bonding chain may optionally contain a bond such as carbonyl, ether, ester, amide, sulfide, sulfinyl, sulfonyl or imino.

26. The solid electrolytic capacitor as claimed in claim 25, wherein said monomer compound containing a 5-membered heterocyclic ring is a compound selected from the group consisting of 3,4-ethylenedioxythiophene and 1,3-dihydroisothianaphthene.

27. A method for producing a solid electrolytic capacitor, comprising the steps of forming an oxide dielectric film on an aluminum foil for solid electrolytic capacitors, the foil being obtained by a method as claimed in claim 1, forming a solid electrolyte on the oxide dielectric film and forming an electrical conducting material thereon.

* * * * *